(12) United States Patent
Tissot

(10) Patent No.: US 9,205,745 B2
(45) Date of Patent: Dec. 8, 2015

(54) TOUCH SENSITIVE CONTROL DEVICE FOR A MOTOR VEHICLE

(75) Inventor: Jean-Marc Tissot, Viuz En Sallaz (FR)

(73) Assignee: DAV, Créteil Cedex (FR)

( * ) Notice: Subject to any disclaimer, the term of this patent is extended or adjusted under 35 U.S.C. 154(b) by 214 days.

(21) Appl. No.: 13/514,057

(22) PCT Filed: Dec. 21, 2010

(86) PCT No.: PCT/FR2010/000859
§ 371 (c)(1),
(2), (4) Date: Jun. 26, 2012

(87) PCT Pub. No.: WO2011/083212
PCT Pub. Date: Jul. 14, 2011

(65) Prior Publication Data
US 2012/0262403 A1    Oct. 18, 2012

(30) Foreign Application Priority Data

Dec. 22, 2009  (FR) ..................................... 09 06250

(51) Int. Cl.
*G06F 3/041* (2006.01)
*B60K 37/06* (2006.01)
(Continued)

(52) U.S. Cl.
CPC ................. *B60K 37/06* (2013.01); *B60K 35/00* (2013.01); *G06F 3/0482* (2013.01); *G06F 3/04883* (2013.01); *B60K 2350/1032* (2013.01); *B60K 2350/962* (2013.01)

(58) Field of Classification Search
CPC ....... B61L 3/127; B60W 20/00; B60W 10/26; B60W 10/08; B60W 2510/244; B60W 10/11; B60W 10/04; B60W 10/06; B60W 2050/0045; B60W 20/50; B60W 2710/0644; B60W 2710/0666; B60W 2710/105; B60W 2710/244; G06F 3/017; G06F 3/0488–3/04886
USPC ................... 345/173; 715/863; 340/933–943, 340/988–996
See application file for complete search history.

(56) References Cited

U.S. PATENT DOCUMENTS 5,781,872 A *  7/1998  Konishi et al. .................. 701/36
6,819,990 B2 * 11/2004  Ichinose ......................... 701/36
(Continued)

FOREIGN PATENT DOCUMENTS

DE       103 02 924 B3    4/2004
EP        1 702 805 A1    9/2006
(Continued)

OTHER PUBLICATIONS

International Search Report w/translation from PCT/FR2010/000859 dated Apr. 6, 2011 (6 pages).
(Continued)

*Primary Examiner* — Stephen Sherman
(74) *Attorney, Agent, or Firm* — Osha Liang LLP

(57) ABSTRACT

The invention relates to a control device for a motor vehicle, including a control touch-sensitive surface (3) configured to detect a gesture by a user, which is exerted on said touch-sensitive surface (3), and a unit (7) for interpreting said detected gesture, in order to generate a command associated with said detected gesture. According to the invention, said control device comprises at least one processing unit (9) configured to alternate the operating mode of said control device between an applied operating mode and a basic operating mode, on the basis of an input parameter for alternating the operating mode.

18 Claims, 3 Drawing Sheets

(51) Int. Cl.
*B60K 35/00* (2006.01)
*G06F 3/0482* (2013.01)
*G06F 3/0488* (2013.01)

(56) References Cited

U.S. PATENT DOCUMENTS

| | | | |
|---|---|---|---|
| 7,858,891 B2* | 12/2010 | Strohband et al. | 200/406 |
| 7,973,773 B2* | 7/2011 | Pryor | 345/173 |
| 2004/0130442 A1* | 7/2004 | Breed et al. | 340/443 |
| 2006/0047386 A1* | 3/2006 | Kanevsky et al. | 701/36 |
| 2006/0256082 A1* | 11/2006 | Cho et al. | 345/156 |
| 2007/0067088 A1* | 3/2007 | Baig | 701/96 |
| 2007/0176797 A1* | 8/2007 | Rhodes et al. | 340/995.15 |
| 2007/0244613 A1 | 10/2007 | Ishikawa et al. | |
| 2008/0059578 A1* | 3/2008 | Albertson et al. | 709/204 |
| 2008/0129684 A1* | 6/2008 | Adams et al. | 345/156 |
| 2010/0162181 A1* | 6/2010 | Shiplacoff et al. | 715/863 |
| 2010/0188343 A1* | 7/2010 | Bach | 345/173 |

FOREIGN PATENT DOCUMENTS

| | | |
|---|---|---|
| EP | 2 075 542 A2 | 7/2009 |
| JP | 2006-029917 A | 2/2006 |
| JP | 2007-302223 A | 11/2007 |
| JP | 2009-090690 A | 4/2009 |
| WO | 03/058359 A1 | 7/2003 |

OTHER PUBLICATIONS

Office Action in counterpart Japanese Patent Application No. 2012-545369, mailed Nov. 18, 2014 (13 pages).

* cited by examiner

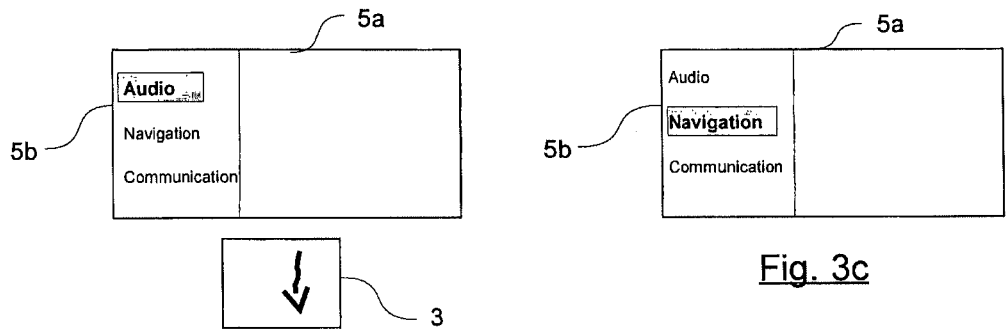
Fig. 3b
Fig. 3c
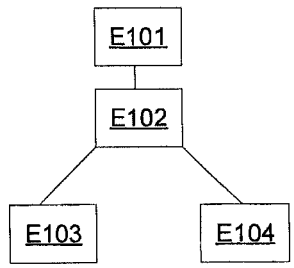
Fig. 4
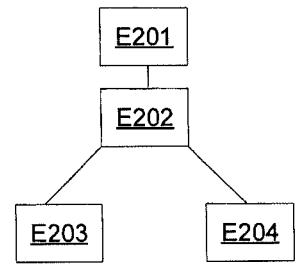
Fig. 5
| DETECTED GESTURE | APPLIED GESTURE CRITERIA | BASIC GESTURE CRITERIA |
|---|---|---|
| gesture 1 | X X | X |
| gesture 2 | - | XXX |
Fig. 6

TOUCH SENSITIVE CONTROL DEVICE FOR A MOTOR VEHICLE

The invention relates to a control device installed in an automobile.

Currently, automobiles are increasingly being fitted with electronic assistance and comfort systems for the driver and passengers, for example air-conditioning, navigation, Internet access, telephony, radio or even audio systems.

These functions can be controlled via a control device which is, for example, arranged in the central console between the two front seats of the automobile.

To increase the ergonomic comfort, a touch-sensitive control surface is increasingly being used to detect a gesture of a user, such as the driver, and, depending on the position and displacement on the touch-sensitive surface, to trigger a command.

In practice, the touch-sensitive surfaces, in particular for the automobile domain, have made significant advances. Examples that can be cited include a technology using pressure-sensitive resistors (also known as FSR sensors, FSR standing for "Force Sensing Resistor"), a capacitive technology or even an optical technology.

However, depending on the driving situations and tasks, the driver cannot control the device by an applied gesture in all circumstances. Furthermore, this requires a concentration effort on the part of the driver which diverts his or her attention from his or her primary driving task with safety consequences.

The aim of the invention is therefore to overcome this drawback of the prior art by affording the user better use of the control device while driving.

To this end, the subject of the invention is a control device for an automobile, comprising a touch-sensitive control surface configured to detect a gesture of a user exerted on said touch-sensitive surface, and a unit for interpreting said detected gesture to generate a command associated with said detected gesture, characterized in that said control device comprises at least one processing unit configured to alternate the operating mode of said control device between an applied operating mode and a basic operating mode, based on an input parameter for alternating the operating mode.

The alternation between an applied mode and a basic mode makes it possible to adapt the use of the control device to the driving so as to avoid having the driver focus on the control device during the procedure with the risk of losing attention to the driving.

Said control device may also comprise one or more of the following features taken separately or in combination:
- the display unit is configured to adapt the display according to the applied or basic operating mode,
- the display of the basic operating mode comprises a graphic representation of functional areas that are enlarged relative to the display of the applied operating mode,
- the display unit comprises a display screen and said touch-sensitive surface is integrated in the display screen,
- said touch-sensitive surface is separate from the display unit,
- the interpretation unit is configured to change the gesture interpretation database of the interpretation unit according to the applied or basic operating mode,
- in the basic operating mode, a basic trajectory gesture is associated with a selection command independently of the length of displacement of the gesture on said touch-sensitive surface,
- the selection command is a displacement command in a pop-up menu with a predetermined incrementation pitch (for example up/down, front/rear, left/right, etc.),
- in the basic operating mode, a gesture of pressure exerted on said touch-sensitive surface according to a predefined duration is associated with a validation command,
- said control device comprises at least one manual selection means for alternating the operating mode of said control device, the activation of which generates an input parameter for the processing unit to alternate the operating mode,
- the input parameter for alternating the operating mode is chosen from the group comprising a dynamic status parameter of the vehicle, a parameter for classifying the gesture exerted on said touch-sensitive surface as applied gesture or basic gesture, a parameter on the user of said control device,
- the processing unit (9) is configured to engage the basic operating mode when, the dynamic status parameter of the vehicle being the detected speed, said speed is above a predefined speed threshold, and to engage the applied operating mode when the detected speed is below said threshold,
- the processing unit is configured to engage the basic operating mode if a gesture detected on said touch-sensitive surface is exerted by the driver,
- the processing unit is configured to engage the applied operating mode if a gesture detected on said touch-sensitive surface is classified as an applied gesture, and to engage the basic operating mode if said detected gesture is classified as a basic gesture,
- said control device comprises a classification module linked to an input of the processing unit and configured to compare a gesture detected on said touch-sensitive surface with a plurality of stored criteria respectively associated with an applied gesture and/or with a basic gesture, and to classify said detected gesture as an applied gesture or as a basic gesture depending on the comparison results,
- at least one stored criterion associated with an applied gesture is chosen from the following criteria: a criterion of single pressure exerted on said touch-sensitive surface, a criterion of constancy of pressure exerted on said touch-sensitive surface, a multi-directional criterion of the gesture exerted on said touch-sensitive surface, a criterion of acceleration of the gesture exerted on said touch-sensitive surface below a predefined acceleration threshold,
- at least one stored criterion associated with a basic gesture is chosen from the following criteria: a criterion of multiple pressures exerted on said touch-sensitive surface in a single direction, a criterion of non-constancy of pressure exerted on said touch-sensitive surface, a criterion of acceleration of the gesture exerted on said touch-sensitive surface above a predefined acceleration threshold,
- said touch-sensitive surface includes sensors sensing multiple pressures,
- said touch-sensitive surface includes pressure sensors.

Other features and advantages of the invention will become more clearly apparent on reading the following description, given as an illustrative and nonlimiting example, and the appended drawings in which:

FIG. 1 schematically represents a control device according to the invention,

Figure 3A:
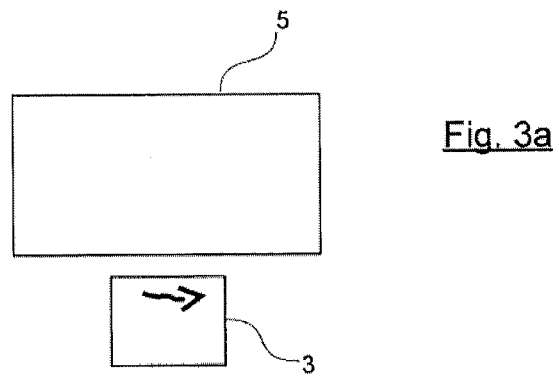
Figure 7:
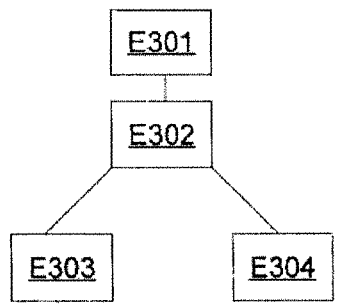

FIG. 3a schematically represents a display screen and a touch-sensitive control surface of the control device, FIG. 3b schematically represents the display screen after a first command on the touch-sensitive control surface, FIG. 3c schematically represents the display screen after a second command on the touch-sensitive surface, FIG. 4 illustrates the various steps of a method for automatically alternating the operating mode according to a dynamic status parameter of the vehicle, for example: the speed of the vehicle, FIG. 5 illustrates the various steps of a method for automatically alternating the operating mode according to the origin of a gesture detected on a touch-sensitive surface of the control device, FIG. 6 is a schematic table of classification of gestures detected on the touch-sensitive surface by comparison with predefined criteria, and FIG. 7 illustrates the various steps of a method for automatically alternating the operating mode according to the classification of the gesture detected on the touch-sensitive surface of the control device.

In these figures, the identical elements are given the same references.

Figure 1:
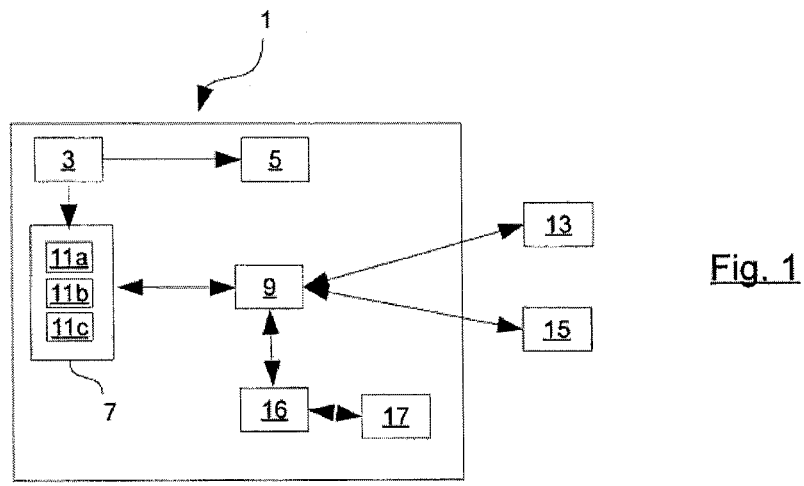

FIG. 1 schematically illustrates a control device 1 installed in an automobile (not represented).

This control device 1 comprises a touch-sensitive control surface 3 on which a user can exert a gesture so as to control an associated function, such as the control of an electrical equipment item of the automobile.

To this end, the touch-sensitive surface 3 comprises sensors for detecting a gesture exerted on the touch-sensitive surface 3.

The control device 1 also comprises a display unit 5 comprising, for example, a display screen in the central console or, as a variant, remotely sited on the windshield of the vehicle, and a unit 7 for interpreting the detected gesture to generate the associated command.

In order to detect a gesture of a user on the touch-sensitive surface 3, the touch-sensitive surface 3 may also comprise pressure-sensitive sensors, more specifically using pressure-sensitive resistive inks (also known by the name FSR sensor, FSR standing for "Force Sensing Resistor").

Provision can also be made for these sensors to be sensors sensing multiple or simultaneous pressures.

It is also possible to provide yet other sensors such as capacitive sensors or even optical sensors.

Moreover in this example, the touch-sensitive surface 3 is represented as being separate from the display unit 5. As an alternative, the touch-sensitive surface 3 is integrated in the display screen of the display unit 5.

Furthermore, the control device 1 comprises a processing unit 9 for alternating the operating mode of the control device 1 between at least two distinct operating modes: an applied operating mode and a basic operating mode.

In the applied operating mode, the user makes use of the control device 1 in an applied manner by being concentrated and in a precise manner, that is to say according to a well-defined trajectory, or, for example, by exerting a substantially constant pressure on the touch-sensitive surface 3.

Conversely, in the basic operating mode, the user makes use of the control device 1 in a more basic manner without being applied or concentrated.

There now follows a description of various exemplary embodiments of the basic operating mode, namely the mode that offers a basic display and/or a basic behavior.

Basic Display

Figures 2A, 2B:
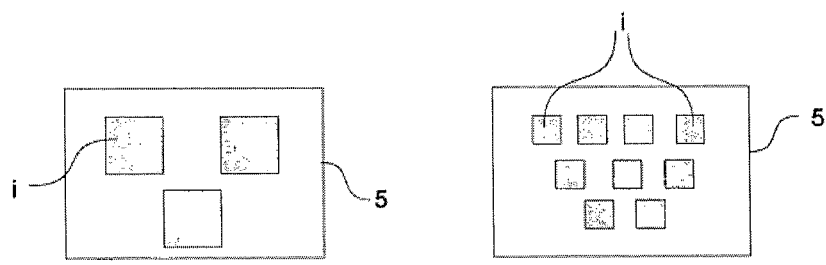
FIG. 2a illustrates an example of display in basic mode.
FIG. 2b illustrates an example of display in applied mode.

In this basic operating mode, the display may be adapted and present a graphic representation of functional areas such as icons i that are enlarged or more detailed or even fewer icons i per menu page (FIG. 2a) compared to the display of the applied operating mode (FIG. 2b). This adapted display enables the user to more easily select the icons i without requiring the same level of concentration as in the applied mode. This graphic representation is not limited to the icons and may extend, for example, to texts or images or images and text, or even to animated images.

In this case, the display unit 5 (FIG. 1) is configured to adapt the display of the screen 5 according to the applied or basic operating mode. More specifically, the processing unit 9 is configured to transmit a display adaptation signal to the display unit 5.

Basic Behavior

As a variant, in the basic operating mode, a pop-up menu, icons, text, images—animated or not—are displayed individually or in combination and the user can exert basic gestures on the touch-sensitive surface 3. The expression "basic gesture" should be understood to mean an imprecise gesture exerted on the touch-sensitive surface 3 by the user, roughly without being applied.

For this, the interpretation unit 7 comprises different databases 11a to 11c for interpreting gestures respectively associated with the different operating modes.

The processing unit 9 is then configured to change the gesture interpretation database 11a, 11b, 11c of the interpretation unit 7 according to the operating mode.

Furthermore, it is possible to provide, for the basic operating mode, a distinct interpretation database 11b, 11c depending on whether the vehicle is stopped or moving. The processing unit 9 may also be linked to sensors sensing movement 13 of the automobile such as sensors on the engine of the vehicle, sensors on the steering column, vehicle speed sensors, or any other sensor making it possible to determine a dynamic status parameter of the vehicle indicating whether the vehicle is stopped or not.

Other dynamic status parameters of the vehicle may also be considered such as, for example, the parameters which make it possible to determine whether the situation of the driver and/or of the vehicle, in parallel with the procedure on the touch-sensitive surface, is "risky" or not. We can cite, for example:
the trim of the vehicle,
the longitudinal and transverse acceleration of the vehicle,
the steering wheel angle and its dynamic range,
the status of the brake pedal or of the clutch,
the status of the acceleration pedal (or devices of under-steering wheel control type),
the state of the ABS,
the speed of the wheels,
the functions engaged just before the procedure on the touch-sensitive surface (comfort or safety),
the state of tiredness of the driver monitored by sensors (cameras, etc.),
the activation of the windscreen wipers or of the headlights, etc.

In this case, when, for example, the motion sensors 13 of the vehicle transmit vehicle stoppage or movement information and the basic mode is engaged, the processing unit 9 transmits a signal to the interpretation unit 7 to select a different gesture interpretation database 11b, 11c depending on whether the vehicle is stopped or moving.

According to the embodiment described, the interpretation unit 7 comprises a first interpretation database 11a associated with the applied operating mode, a second interpretation database 11*b* associated with the basic operating mode when the vehicle is stopped and a third interpretation database 11*c* associated with the basic operating mode when the vehicle is running.

Consequently, in the basic operating mode when the automobile is stopped, a first command associated with a basic gesture detected on the touch-sensitive surface 3 is generated and, when the automobile is moving, a second command associated with the detected basic gesture is generated, the second command being able to be different from the first command.

Moreover, for a basic gesture of the user, for example in a predetermined direction, it is possible to generate a command to display the pop-up menu or even a command to navigate in the pop-up menu with a predetermined pitch independently of the length of the basic gesture exerted.

An example of navigation in a pop-up menu in basic operating mode according to this variant is illustrated by FIGS. 3*a* to 3*c*.

By performing a basic gesture, for example from left to right on the touch-sensitive surface 3, represented by the arrow in FIG. 3*a*, it is possible, for example, to display a pop-up menu on the display unit 5 (FIG. 3*b*).

The display unit 5 may then comprise a main display 5*a* and a menu display 5*b* which may, for example, appear sliding from left to right. In this case, the main display 5*a* may be reconfigured to be adapted to the new size or else the menu display 5*b* may be partially transparent.

When the menu is displayed, a function may be selected by default, here the "Audio" function, and to change the selection provision can be made for a basic gesture, for example from top to bottom or from bottom to top, to make it possible to navigate in the menu. In this example, by performing a downward gesture as illustrated by the arrow in FIG. 3*b*, the next function, "Navigation", is selected (FIG. 3*c*).

In this example, whatever the length of displacement of the gesture according to the arrow illustrated in FIG. 3*a*, the associated command which is generated is a menu display command 5*b* (FIG. 3*b*). Similarly, whatever the length of displacement of the gesture according to the arrow illustrated in FIG. 3*b*, the associated command which is generated is a command to select the next function in the menu.

Thus, each basic gesture given is associated with a command to move, in the pop-up menu, by one object independently of the length of the gesture.

An associated command is therefore generated without taking into account the length of displacement of the basic gesture exerted on the touch-sensitive surface 3.

Furthermore, a number of levels can be provided in the basic operating mode, these levels being respectively associated with a predefined pitch. As an example, in a third level of the basic operating mode, a given basic gesture is associated with a command to move in the pop-up menu by five objects regardless of the length of the gesture.

Obviously, the pitch options of these different levels of the basic operating mode can be configured by the user according to his or her preferences, or can differ depending on the type of list. It could be defined and/or self-adapted for example according to the length of the list (small pitches for small lists, large pitches for large lists, average pitches for average lists) or its type (small pitches for radio stations, large pitches for telephone).

In the basic operating mode, a basic trajectory gesture on the part of the user on the touch-sensitive surface in a predefined direction is therefore associated independently to its length with a command to select, for example, a function in a pop-up menu by displacement according to a predetermined pitch.

For the validation of the selected object, the user must perform a validation gesture, such as, for example, a pressure of a duration that is predefined for example by an applied gesture.

Basic Display and Behavior

A basic operating mode can also be provided which combines a basic display and a basic behavior of the user. In particular, a basic gesture on the part of the user, for example in a given direction, may make it possible to scan the large icons of the basic display.

Hereinafter in the description, two ways of alternating the applied and basic operating modes of the control device 1 are described: manually and automatically.

Manually Alternating Operating Modes

Referring once again to FIG. 1, to alternate the operating mode of the control device 1 to switch from the applied operating mode to the basic operating mode and vice versa, by transmitting a signal to the display unit 5 to adapt the display and/or by transmitting a signal to the interpretation unit 7 to select an appropriate interpretation database 11*a*, 11*b*, 11*c*, the processing unit 9 may include a manual selection means (not represented) on which the user presses according to a first embodiment.

It is possible to provide a single selection means which makes it possible to alternate the operating mode, or even a number of selection means respectively associated with one operating mode in order to engage it.

Obviously, this selection means may be a physical button of the control device 1 or even an associated touch-sensitive area of the touch-sensitive surface 3.

When the user presses on a selection means, the processing unit 9 then receives an input parameter activating the selection means to alternate the operating mode.

Automatically Alternating Operating Modes

As an alternative to the first embodiment, the change of operating mode is done automatically, that is to say, without the intervention of the user.

This automatic alternation can be done according to different input parameters, such as:
- the speed of the vehicle,
- the author of a gesture detected on the touch-sensitive surface 3, namely the driver or a passenger,
- the classification of a gesture detected on the touch-sensitive surface 3 as an applied or basic gesture.

These different cases will now be described.

Automatically Alternating Operating Modes According to the Speed of the Vehicle

According to a second embodiment, the automatic alternation is done according to the speed of the vehicle.

To this end, the processing unit 9 comprises an input linked to a comparison module 15 comprising vehicle speed sensors such as a wheel sensor of an Anti-lock Braking System (ABS) or any other speed sensor of the vehicle and a comparator comparing the speed measured by the speed sensors with a predetermined speed threshold.

The comparison module 15 also comprises at least one processing means in order to transmit the comparison results in input parameter form to the processing unit 9. This processing unit 9 is configured to alternate the operating mode according to these comparison results, namely: when the measured speed is below the predefined speed threshold, initiate the applied mode if in basic mode, and do nothing if already in applied mode; and, on the other hand, when the measured speed is above the predetermined speed threshold, engage the basic mode if in applied mode, and do nothing if already in basic mode.

Thus, by referring to FIG. 4, in the step E101, the speed sensors measure the speed of the vehicle and transmit a speed information item to the comparator for a comparison in the step E102 of the measured speed with the predetermined speed threshold. If the measured speed is below the predetermined speed threshold, the applied mode is selected in the step E103 and, otherwise, the basic mode is selected in the step E104.

Dynamic status parameters of the vehicle other than that of the speed of the vehicle could also have been envisaged here by way of example.

Automatically Alternating Operating Modes According to the Author of the Detected Gesture A third embodiment differs from the second embodiment by the fact that the operating mode is alternated automatically according to the author of a gesture detected on the touch-sensitive surface 3.

It is possible, for example, to provide for the detected gesture exerted by the driver to result in an automatic switch to basic operating mode.

Obviously, it is also possible to provide for the applied operating mode to be engaged when the gesture is exerted by a passenger.

For this, the processing unit 9 (FIG. 1) comprises an input linked to a determination means for determining whether the detected gesture is exerted by the driver or by a passenger, such as an optical sensor. It is also possible to place a weight sensor in the passenger seat, and if this weight sensor transmits an information item concerning the absence of a passenger on the seat, it is considered that the detected gesture has been exerted by the driver.

Thus, when a gesture exerted by the user on the touch-sensitive surface 3 is detected in the step E201 (FIG. 5), the origin of the gesture detected in the step E202 is queried. For example, a check is made to see if the signals are received from the optical or weight sensors in the passenger seat and these signals are analyzed in order to determine the origin of the detected gesture. If the detected gesture is a gesture exerted by the driver, the basic mode is selected in the step E203. On the other hand, if the detected gesture is exerted by a passenger, the applied mode may be selected in the step E204.

Automatically Alternating Operating Modes According to the Classification of the Detected Gesture According to yet a fourth embodiment, the operating mode is automatically changed according to the classification of the gesture, applied or basic, detected on the touch-sensitive surface 3 (FIG. 1).

More specifically, there is an automatic switch to the basic operating mode if a basic gesture is detected and to the applied operating mode if an applied gesture is detected.

To this end, the control device 1 comprises a classification module 16 to analyze the detected gesture using a plurality of stored criteria respectively associated with an applied gesture and with a basic gesture.

These analysis criteria are, for example, stored in a memory 17 of the control device 1.

Examples of stored criteria associated with an applied gesture include: a criterion of a single pressure exerted on the touch-sensitive surface 3, a criterion of constancy of pressure exerted on the touch-sensitive surface 3, a multi-directional criterion of the gesture exerted on the touch-sensitive surface 3, or even a criterion of acceleration of the gesture exerted on the touch-sensitive surface below a predefined acceleration threshold.

Similarly, examples of stored criteria associated with a basic gesture may include: a criterion of non-constancy of pressure exerted on the touch-sensitive surface 3, a criterion of acceleration of the gesture exerted on the touch-sensitive surface 3 above the predefined acceleration threshold, a criterion of multiple pressures exerted on the touch-sensitive surface 3 in a common direction.

Obviously, any other criterion making it possible to distinguish an applied gesture from a basic gesture may be envisaged.

The classification module 16 may also comprise a computer for computing, on the one hand, the number of stored criteria associated with an applied gesture and, on the other hand, the number of stored criteria associated with a basic gesture to which the detected gesture responds.

For example, if the detected gesture responds to a majority of stored criteria associated with an applied gesture, the classification module 16 classifies the detected gesture as an applied gesture.

On the other hand, the classification module 16 classifies the detected gesture as a basic gesture for example if the detected gesture responds to as many stored criteria associated with an applied gesture as stored criteria associated with a basic gesture, or even if the detected gesture responds to a majority of stored criteria associated with a basic gesture.

Referring to FIG. 6, take, for example, a first gesture "gesture 1" with the following features:
multiple pressures in a common direction,
constant pressure,
acceleration below the predefined threshold.

Two applied gesture criteria are counted, which are: constant pressure, acceleration below the predefined threshold, as well as a basic gesture criterion: multiple pressures in a common direction. In all, two applied gesture criteria are counted against one basic gesture criterion.

There is a majority of applied gesture criteria for the gesture 1 which is therefore classified as applied gesture.

Similarly, take the example of a second gesture "gesture 2" having the following features:
multiple pressures in a common direction,
non-constant pressure,
acceleration above the predefined threshold.

Thus, three basic gesture criteria are counted. There are only basic gesture criteria for the gesture 2 which is therefore classified as basic gesture.

It is therefore possible to simply differentiate an applied gesture on the part of the user from a basic gesture, so as to switch to basic operating mode enabling the user to use the control device 1 without requiring a high degree of concentration on the part of the user, particularly if the latter is driving, thus increasing safety.

Thus, by referring to FIG. 7, in a first step E301, a gesture exerted on the touch-sensitive surface 3 is detected.

Then, in the step E302, the detected gesture is analyzed using criteria stored for example in the memory 17, and, on the basis of the analysis results, a determination is made as to whether the detected gesture is an applied gesture or a basic gesture.

If the detected gesture is an applied gesture, in the step E303 the applied operating mode is selected if in basic operating mode and the applied operating mode is retained if already in applied operating mode.

Conversely, if the detected gesture is a basic gesture, in the step E304 the basic operating mode is selected if in applied operating mode and the basic operating mode is retained if already in basic operating mode.

It will therefore be understood that such a control device 1 makes it possible to simply alternate the operating mode between an applied operating mode and a basic operating mode, allowing for a use of the control device that is more appropriate to driving without compromising the safety of the driver and that of other people.

The invention claimed is:

1. A control device for an automobile, comprising:
   a touch-sensitive control surface configured to detect a gesture of a user exerted on said touch-sensitive surface;
   a unit for interpreting said detected gesture to generate a command associated with said detected gesture, wherein the unit for interpreting comprises a plurality of gesture interpretation databases; and
   at least one processing unit configured to alternate the operating mode of said control device between an applied operating mode and a basic operating mode, based on at least one input parameter for alternating the operating mode;
   at least one motion sensor of said automobile configured to transmit vehicle stoppage or movement information; and
   wherein the at least one processing unit is configured to change one of the plurality of gesture interpretation databases of the unit for interpreting according to the operating mode, and
   wherein, when said basic operating mode is engaged, said at least one processing unit transmits a signal to said unit for interpreting to select a first gesture interpretation database when said automobile is stopped, and a second gesture interpretation database when said automobile is moving.

2. The control device as claimed in claim 1, further comprising a display unit configured to adapt a display according to the applied or the basic operating mode.

3. The control device as claimed in claim 2, wherein the display of the basic operating mode comprises a graphic representation of functional areas that are enlarged relative to the display of the applied operating mode.

4. The control device as claimed in claim 2, wherein the display unit comprises a display screen and said touch-sensitive surface is integrated in the display screen.

5. The control device as claimed in claim 2, wherein said touch-sensitive surface is separate from the display unit.

6. The control device as claimed in claim 1, wherein, in the basic operating mode, a trajectory gesture is associated with a selection command independently of a length of displacement of the gesture on said touch-sensitive surface.

7. The control device as claimed in claim 6, wherein the selection command is a displacement command in a pop-up menu with a predetermined pitch.

8. The control device as claimed in claim 1, wherein in the basic operating mode, a gesture of pressure exerted on said touch-sensitive surface according to a predefined duration is associated with a validation command.

9. The control device as claimed in claim 1, further comprising at least one manual selection means for alternating the operating mode of said control device, the activation of which generates an input parameter for the processing unit to alternate the operating mode.

10. The control device as claimed in claim 1, wherein the input parameter for alternating the operating mode is chosen from the group comprising a dynamic status parameter of the vehicle, a parameter for classifying the gesture exerted on said touch-sensitive surface as an applied gesture or a basic gesture, and a parameter on the user of said control device.

11. The control device as claimed in claim 10, wherein the processing unit is configured to engage the basic operating mode when, the dynamic status parameter of the vehicle being a detected speed, said detected speed is above a predefined speed threshold, and to engage the applied operating mode when the detected speed is below said threshold.

12. The control device as claimed in claim 10, wherein the processing unit is configured to engage the basic operating mode if the gesture detected on said touch-sensitive surface is exerted by the driver.

13. The control device as claimed in claim 10, wherein the processing unit is configured to engage the applied operating mode if the gesture detected on said touch-sensitive surface is classified as the applied gesture, and to engage the basic operating mode if said detected gesture is classified as the basic gesture.

14. The control device as claimed in claim 13, further comprising a classification module linked to an input of the processing unit and configured to compare the gesture detected on said touch-sensitive surface with a plurality of stored criteria respectively associated with the applied gesture and/or with the basic gesture, and to classify said detected gesture as the applied gesture or as the basic gesture depending on comparison results.

15. The control device as claimed in claim 14, wherein at least one stored criterion associated with the applied gesture is chosen from the following criteria: a criterion of single pressure exerted on said touch-sensitive surface, a criterion of constancy of pressure exerted on said touch-sensitive surface, a multi-directional criterion of the gesture exerted on said touch-sensitive surface, a criterion of acceleration of the gesture exerted on said touch-sensitive surface below a predefined acceleration threshold.

16. The control device as claimed in claim 14, wherein at least one stored criterion associated with the basic gesture is chosen from the following criteria: a criterion of multiple pressures exerted on said touch-sensitive surface in a single direction, a criterion of non-constancy of pressure exerted on said touch-sensitive surface, a criterion of acceleration of the gesture exerted on said touch-sensitive surface above a predefined acceleration threshold.

17. The control device as claimed in claim 1, wherein said touch-sensitive surface includes sensors sensing multiple pressures.

18. The control device as claimed in claim 1, wherein said touch-sensitive surface includes pressure sensors.

* * * * *